US006278059B1

(12) United States Patent
Lefton

(10) Patent No.: US 6,278,059 B1
(45) Date of Patent: Aug. 21, 2001

(54) ELECTRONICS HOUSING HAVING A FLEXIBLE OUTER FLANGE

(75) Inventor: Scott Avram Lefton, Melrose, MA (US)

(73) Assignee: Fishman Transducers, Inc., Wilmington, MA (US)

( * ) Notice: Subject to any disclaimer, the term of this patent is extended or adjusted under 35 U.S.C. 154(b) by 0 days.

(21) Appl. No.: 09/433,410

(22) Filed: Nov. 3, 1999

Related U.S. Application Data

(60) Provisional application No. 60/116,744, filed on Jan. 22, 1999.

(51) Int. Cl.[7] ....................................................... H02G 3/08

(52) U.S. Cl. ................................ 174/50; 174/58; 174/63; 220/3.2

(58) Field of Search .................................... 174/50, 50.54, 174/52.1, 52.4, 52.6, 53, 54, 55, 56, 57, 58, 48, 63; 220/3.2, 3.3, 3.4, 3.5, 3.6, 3.7, 3.8, 3.92, 3.94; 84/267, 743, 723, 735–742

(56) References Cited

U.S. PATENT DOCUMENTS

| | | | | |
|---|---|---|---|---|
| 3,575,313 | * | 4/1971 | Trachtenberg et al. | 174/58 |
| 3,659,037 | * | 4/1972 | MacDonald | 174/58 |
| 3,770,873 | * | 11/1973 | Brown | 174/58 |
| 3,778,528 | * | 12/1973 | Heifetz et al. | 174/48 |
| 4,059,327 | * | 11/1977 | Vann | 174/66 |
| 4,114,008 | * | 9/1978 | Luetzow | 174/50.62 |
| 4,134,636 | * | 1/1979 | Kleinatland et al. | 174/58 |
| 4,265,365 | | 5/1981 | Boteler | 220/3.3 |
| 4,351,217 | | 9/1982 | Wechter | 84/1.16 |
| 4,425,831 | | 1/1984 | Lipman | 84/1.16 |
| 4,632,003 | | 12/1986 | Kopp | 84/1.16 |
| 5,010,802 | | 4/1991 | Lanham | 84/743 |
| 5,029,511 | | 7/1991 | Rosendahl | 84/743 |
| 5,252,777 | | 10/1993 | Allen | 84/726 |
| 5,438,158 | | 8/1995 | Riboloff | 84/727 |
| 5,553,730 | | 9/1996 | Kohnen | 220/3.2 |
| 5,637,823 | | 6/1997 | Dodge | 84/743 |
| 5,693,898 | | 12/1997 | Fishman | 84/267 |
| 5,837,912 | | 11/1998 | Eagen | 84/267 |
| 5,959,246 | * | 9/1999 | Gretz | 174/50 |
| 6,103,972 | * | 8/2000 | Hagarty | 174/53 |

* cited by examiner

*Primary Examiner*—Dean A. Reichard
*Assistant Examiner*—Angel R. Estrada
(74) *Attorney, Agent, or Firm*—Weingarten, Schurgin, Gagnebin & Hayes LLP

(57) ABSTRACT

A housing for an electronics package that has a flexible mounting flange that conformably engages the housing to a variety of planar or contoured surfaces is described. The housing, also comprised of an enclosure attached to the flexible mounting flange, provides for the protection and orderly confinement of electronics packages, such as signal conditioning circuitry, disposed within the housing. The housing is inserted into an aperture in a surface, such as the side of acoustic stringed instrument, until the flexible mounting flange engages the planar or contoured surface. The housing is then removably attached to the surface of the aperture.

15 Claims, 5 Drawing Sheets

ELECTRONICS HOUSING HAVING A FLEXIBLE OUTER FLANGE

CROSS REFERENCE TO RELATED APPLICATIONS

This application claims priority of U.S. Provisional Patent Application No. 60/116,744, filed Jan. 22, 1999.

STATEMENT REGARDING FEDERALLY SPONSORED RESEARCH OR DEVELOPMENT

N/A

1. Field of the Invention

The present invention relates generally to a housing for an electronics package and more particularly, to an electronics package housing that conforms to the contour of a surface onto which the housing is installed.

2. Background of the Invention

At present, electronics housings that are installed within other structures are constructed from rigid, non-flexible materials. Generally, these housings have a rigidly attached, non-flexible, outer flange or other rigid means for attaching the housing to other structures. The rigid housing provides for the protection and orderly confinement of one or more electronics packages housed therein, including electronic sound conditioning circuitry for stringed acoustic instruments, electrical outlet receptacles, electrical light switches, or other electrical components. The rigid outer flange that is attached to the open face of the housing secures the housing to the surface of the structure into which the housing is inserted.

In use, the electronics housing is inserted into openings in structures such as stringed acoustic instruments, walls, ceilings and floors, Upon insertion into an opening in a structure, the floor and sidewalls of the housing descend through the opening until the rigid flange engages the exterior surface of the structure into which the housing is inserted. Following engagement, the flange is then attached to the surface of the structure.

Many structures, such as so-called "electrified" acoustic stringed instruments, or other electronic structures such as communications reflectors or radar dishes, require electronics packages to be internally housed within the structure in order for the structure to function properly. Many of these structures, however, do not have uniformly flat exterior surfaces. For example, the side surfaces of electrified acoustic guitars, violins, violas, cellos and the like are typically sinuous and have varying degrees of slope. These instruments are also manufactured in many different sizes, shapes, dimensions and contours. Further, communications reflectors and radar dishes are also manufactured in many different sizes, shapes, dimensions and contours, and have concave interior surfaces and convex exterior surfaces.

At present, however, known electronics housings that have a rigid outer flange attached to the remainder of the housing cannot be used satisfactorily on any of the above structures because the flange cannot conformably engage contoured surfaces. For example, after an electronics housing has descended into the opening in the side of a guitar, a non-flexible, flat, outer flange will come into contact with the exterior surface of the side of the guitar. However, if the flange is placed across a concave valley in the side of the guitar, such that the ends of the flange contact the side of the guitar, the flange cannot completely engage the contoured surface because a gap will form between the side of the guitar and a point on the flange intermediate the ends of the flange. Further, if the flange is placed across the peak of a convex curve in the side of the guitar, the ends of the flange will not be in contact with the side of the guitar. As a result, the flat, non-flexible outer flange cannot conformably engage the curved surface of the side of a guitar, or any other irregularly contoured structure. Thus, there is a need for an electronics housing with a flexible outer flange that has the ability to be conformably engaged on and removably attached to a variety of contoured surface.

Known electronics housings do not accomplish this goal. For example, U.S. Pat. No. 5,553,730 pertains to a housing for an electronics package. This housing, however, does not have any flange for attaching the housing to a structure. Further, the housing is pre-fabricated in a manner that matches the exact shape of the exterior surface of the structure into which the housing is inserted. Thus, this housing cannot be used on a variety of surfaces having different shapes, slopes or contours.

U.S. Pat. No. 5,693,898 pertains to an electronics control panel that is pivotally attached to opposite sides of a peripheral flange. However, this reference does not possess the advantages of the present invention because the control panel causes the flange to resist adaptation to a contour having a negative or positive curve along the axis of the hinge. Thus, this reference is not particularly suited for use on some contoured surfaces.

Further, in order to repair, modify, or change an electronics package housed within a structure, it is desirable to be able to completely remove the package from the structure without causing damage to the package or the structure. This reference does not provide complete access to the electronics package stored thereunder because it is pivotably attached to the flange. Pivotable attachment provides only limited access to the electronics package stored thereunder. Complete access to the electronics package would only be accomplished by removing the flange from the side of the guitar. However, repeatedly removing the flange from the side of the guitar in order to gain complete access to the electronics package may result in damage to the package, the flange, and more importantly, to the side of the guitar. Thus, the pivoting structure of this reference does not encourage such accessibility.

From the foregoing, there is a need for an electronics housing that flexibly and conformably engages a variety of contoured surface and that provides complete accessibility, interchangeability and removability of an electronics package housed therein while providing for the protection and orderly confinement of an electronics package housed therein.

BRIEF SUMMARY OF THE INVENTION

The present disclosure overcomes the deficiencies of the prior art by providing a housing for an electronics package that has a flexible, outer mounting flange that conformably engages the housing to a variety of planar or contoured surfaces.

In a preferred embodiment, the present disclosure is a housing for electronic signal conditioning circuitry for use in an acoustic stringed instrument, where the housing is capable of flexibly and conformably engaging and being removably attached to the contoured side of the instrument. According to one example of a preferred embodiment, the enclosure of the housing has a floor, sidewalls and an open face dimensioned to receive an open face cover. The housing also has a flexible, outer, mounting flange that is disposed adjacent the open face of the enclosure.

In a presently preferred embodiment, the electronics housing is inserted into an opening in the side of an acoustic stringed instrument, such as an acoustic guitar. The floor and sidewalls of the electronics housing descend through the opening in the side of the guitar until the mounting flange engages the contoured exterior surface of the guitar. Following engagement between the flange and the surface of the guitar, the housing is removably attached to the surface of the guitar.

The open face cover is preferably constructed as an electronics control panel for signal conditioning circuitry and other components enclosed within the housing. The control panel and associated electronics are inserted into the open face of the housing. Upon insertion, the control panel is removably attached to the housing by clips or other resilient members. Thus, because the control panel is removable, it facilitates complete accessibility to the electronic circuitry and components housed therein. It also facilitates interchangeability of control panels, electronic circuitry and components requiring the removal of the flange and extracting the entire housing from the structure in which it is disposed. The clips that removably attach the control panel to the housing do not restrict the ability of the flange to flexibly engage or to be removably attached to the surface of a structure. Because the flange conforms to a variety of surfaces, it allows manufacturers to use a single housing in a multitude of instruments that have different shapes and contours.

According to another aspect of this disclosure, the electronics housing provides for the protection and orderly confinement of many types of electronic circuitry and components, including electronic sound conditioning circuitry for acoustic stringed instruments. Additionally, because the control panel is removably attached to the housing, not fixed as with the prior art, it enables the more efficient utilization of the space within the housing. A battery holder is provided in association with the control panel in a further embodiment.

BRIEF DESCRIPTION OF THE SEVERAL VIEWS OF THE DRAWING

These and other advantages may be more fully understood with reference to the following description and accompanying drawings, of which.

DETAILED DESCRIPTION OF THE INVENTION

Figure 1:
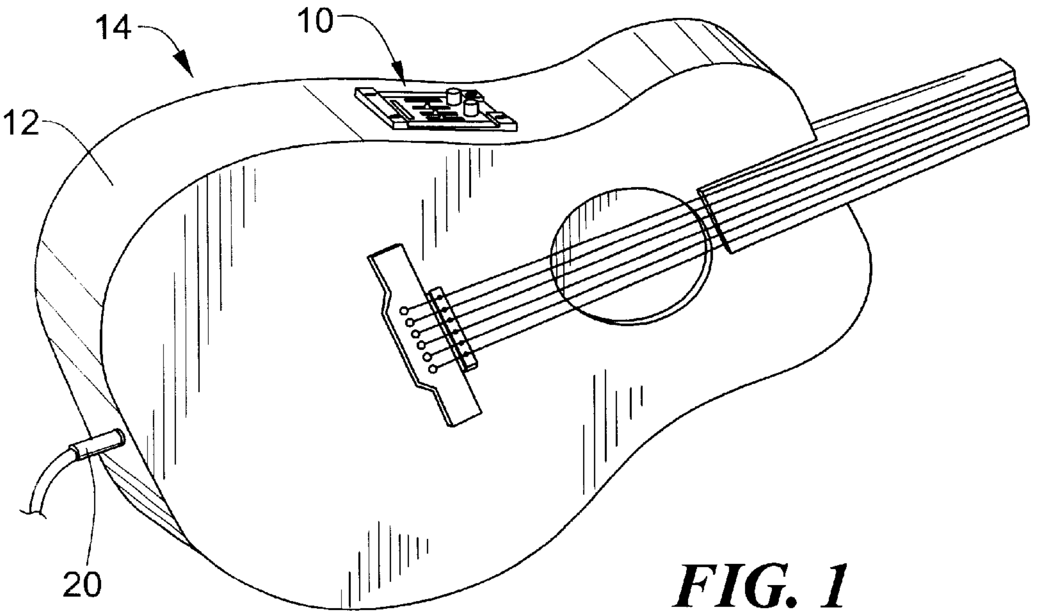
FIG. 1 is a perspective view of a housing for an electronics package disposed within an acoustic guitar.

A housing 10 for an electronics package as presently disclosed is illustrated within the side 12 of an acoustic guitar 14 in FIG. 1. In a preferred embodiment of this disclosure, the electronics package contained within housing 10 consists of electronic signal conditioning circuitry for an acoustic stringed instrument, a power source and other components and enclosures. The conditioning circuitry is connected to pickups disposed in or near a bridge of the guitar 14 that generate electrical signals in response to string vibrations. The conditioning circuitry is also connected via an output jack 20 to an external circuit (not shown) for amplification and/or further signal conditioning.

The housing 10 for an electronics package is further illustrated in FIGS. 2–8 and 18. In one embodiment of this disclosure, the housing 10 has a floor 30, a pair of end walls 31, a pair of side walls 32 and an open face 34 as defined by the top of the end and side walls 31, 32. The floor 30 and end and side walls 31, 32 of the housing may be collectively referred to as an enclosure. This enclosure provides for the protection and orderly confinement of an electronics package housed therein. The open face 34 of the housing 10 provides access to the interior of housing 10 and also may function as a receptacle for a releasably attached open face cover 36 that will be discussed in more detail in conjunction with FIGS. 9–12. Also associated with the open face cover 36, in a preferred embodiment, is a battery holder 92, to be discussed in further detail with respect to FIGS. 13–17. The open face cover 36 is inserted into the housing 10 through its open face 34. When inserted into the open face 34 of the housing 10, the cover 36 forms a complete enclosure for the electronics package housed therein.

According to a preferred embodiment of this disclosure, an outer flange 54 is attached to the housing 10 by flange supports 56. The outer flange 54 has an interior surface 58 and an exterior surface 60. In the illustrated embodiment, the interior surface 58 of the flange 54 is vertically aligned with the interior surfaces of the end and side walls 31, 32. The exterior surface 60 of the flange 54 extends beyond the exterior surfaces of the end and side walls 31, 32.

Following insertion of the housing 10 into an opening in a guitar, the outer flange 54 engages the side 12 of the guitar. Following engagement between the flange 54 and the side 12 of the guitar 14, fasteners, such as screws, are inserted through holes 62 in the flange 54 and into the side 12 of the guitar 14 and releasably attach the housing 10 to the guitar.

Figure 5:
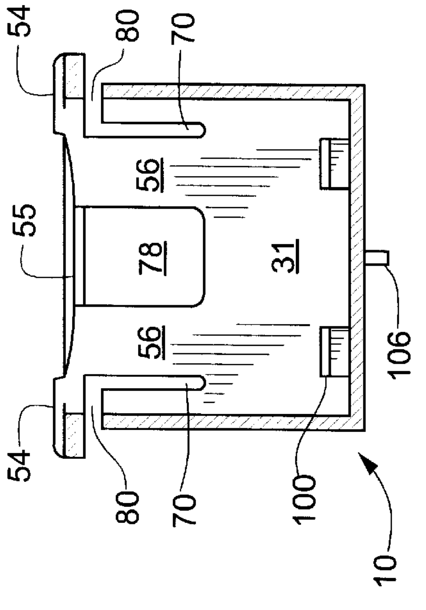
FIG. 5 is a cross section of an end of the housing of FIG. 1.

The flange 54 is flexibly attached to the housing 10 by flange supports 56, as shown in FIG. 5. In a first embodiment, the flange supports are provided as pairs of rectangular tabs extending from a respective one of opposing end walls 31 of the housing 10. The flange supports 56 are constructed by cutting away or by molding channels 70 into the end walls 31. By extending the channels 70 into the end walls 31, the flange supports 56 are capable of being resiliently flexed when the housing is fabricated of suitable material such as NYLON 6.

In a further embodiment, some channels 78 may be dimensioned to accommodate the resilient clips 52 that are disposed on the control panel 38, as illustrated in FIGS. 9–12. The resilient clips 52 are to be inserted into the channels 78 as the control panel 38 descends into the open face 34 of the housing 10.

The flange supports 56 are the only part of the housing 10 that have contact with the outer flange 54. Thus, in a preferred embodiment, no part of the end walls 31, or of the side walls 32, other than the portions comprising the flange supports 56, have any contact with the outer flange 54. As a result, an open space 80 extends around the periphery of the housing 10 between the flange supports 56. The open space 80 facilitates increased flexibility of the outer flange 54 because the outer flange 54 is capable of travelling within the open space 80 when engaging concave and convex surfaces, such as those of the side 12 of a guitar 14, or any other contoured surfaces. Preferably, the height of the open space 80 is established, in part, based upon the contours of surfaces on which the flange 54 is to be mounted.

Figure 8:
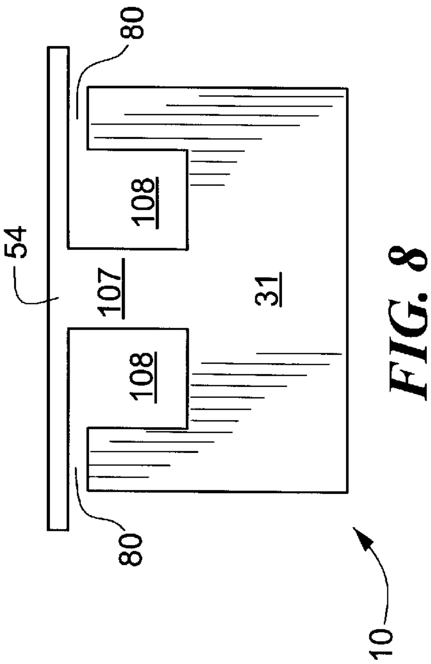
FIG. 8 is an end elevation view of an alternative embodiment of the housing of FIG. 1.
Figure 7:
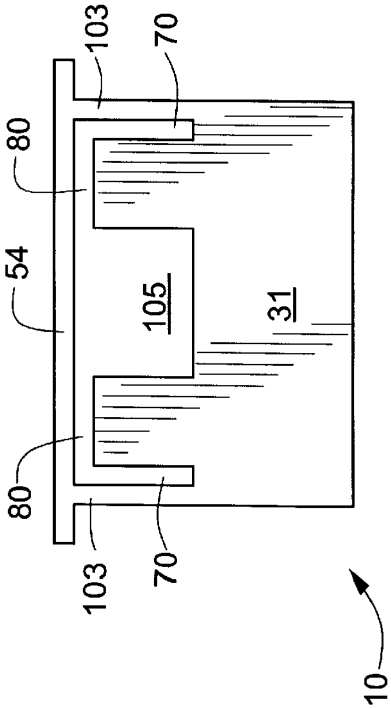
FIG. 7 is an end elevation view of an alternative embodiment of the housing of FIG. 1.
Figure 9:
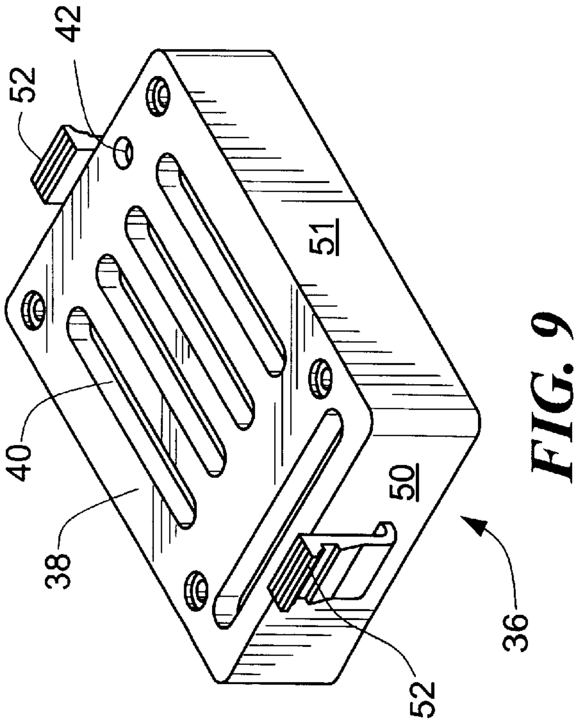
FIG. 9 is a top perspective view of a releasably attached open face cover according to the present invention.
Figure 10:
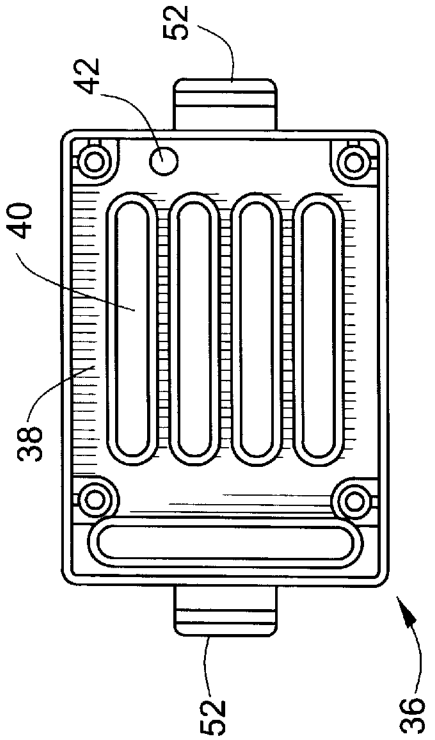
FIG. 10 is a bottom plan view of the cover of FIG. 9.
Figure 11:
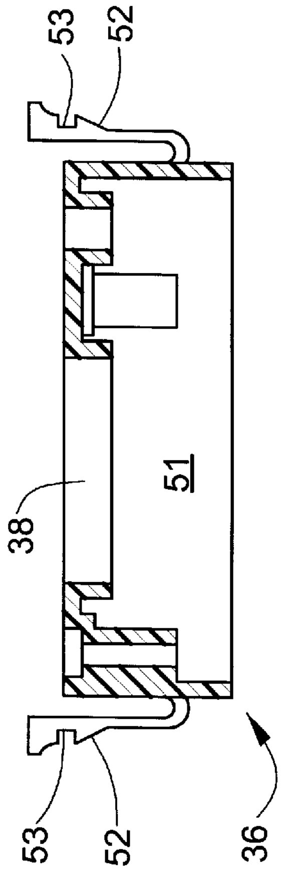
FIG. 11 is a cross section of a side of the cover of FIG. 9.
Figure 12:
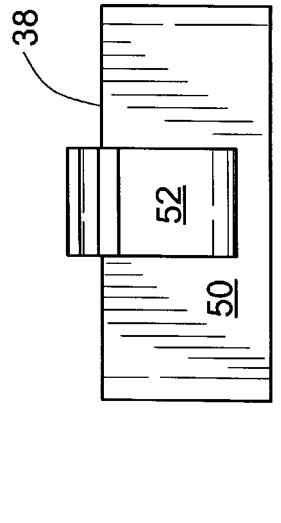
FIG. 12 is an end view of the cover of FIG. 9.
Figure 15:
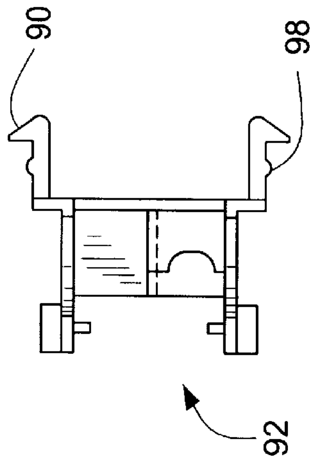
FIG. 15 is an end plan view of the holder of FIG. 13.
Figure 14:
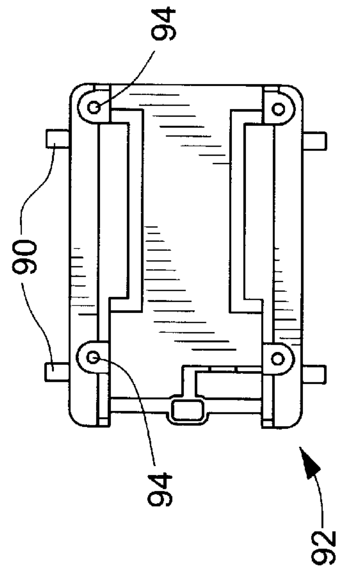
FIG. 14 is a top plan view of the holder of FIG. 13.
Figure 13:
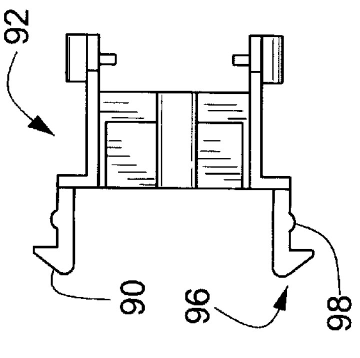
FIG. 13 is an end plan view of a battery holder that is disposable adjacent the housing of FIG. 1.

In other embodiments of this disclosure, the flange supports 56 and the channels 70 that define them can vary in number, depth and width, as illustrated in FIGS. 7 and 8. For example, in a different embodiment of this disclosure, the flange supports are post-like tabs 103 that are located at the corners of the housing 10. The channels 70 function to define the structure of the post-like tabs 103 and to enhance their flexibility. The channels 105 that are disposed centrally on the end walls 31 may be dimensioned to receive the resilient clips 52 as the control panel 38 is inserted into the housing 10. In another embodiment, the flange supports are tabular structures 107 disposed centrally on the end walls 31 of the housing 10. The channels 108 that define these tabular structures 107 also enhance the flexibility of the tabular structures 107 and are dimensioned to receive alternative embodiments of the resilient clips 52 of the control panel 38.

FIGS. 9–12 illustrate the releasably attached open face cover 36. In one embodiment of the present disclosure, the open face cover 36 includes a control panel 38 for electronic signal conditioning circuitry for an acoustic stringed instrument, such as a guitar 14. The control panel 38 is configured with apertures as required by the electronics disposed within the open face cover 36. Such apertures may include slots 40 and access ports 42. These slots 40 and access ports 42 create openings through the surface of the control panel 38 for linear controls (not shown) to move within slots 40 and indicators such as an LED to be disposed within the access ports 42. Linear controls and indicators operate in cooperation with electronic circuitry (not shown) housed thereunder. Other apertures may be provided for various controls and indicators as required to accommodate the underlying electronics.

Electronic circuitry such as for use in signal conditioning the output from instrument transducers can be embodied on a circuit board dimensioned to fit within the open face cover 36. Fasteners such as screws may be used to affix the circuit board to the cover 36. In other embodiments, the control panel 38 functions with various types of enclosed electronics packages, or serves as a light switch cover, electrical outlet receptacle cover or the like.

The control panel 38 also has end walls 50 and side walls 51 that extend vertically downward from the top of the control panel 38. According to a preferred embodiment of this disclosure, a resilient Clip 52 is disposed on each of the end walls 50 on opposite sides of the control panel 38. The resilient clips 52 facilitate the removable installation of the control panel 38 and associated electronics into the housing 10.

Figure 2:
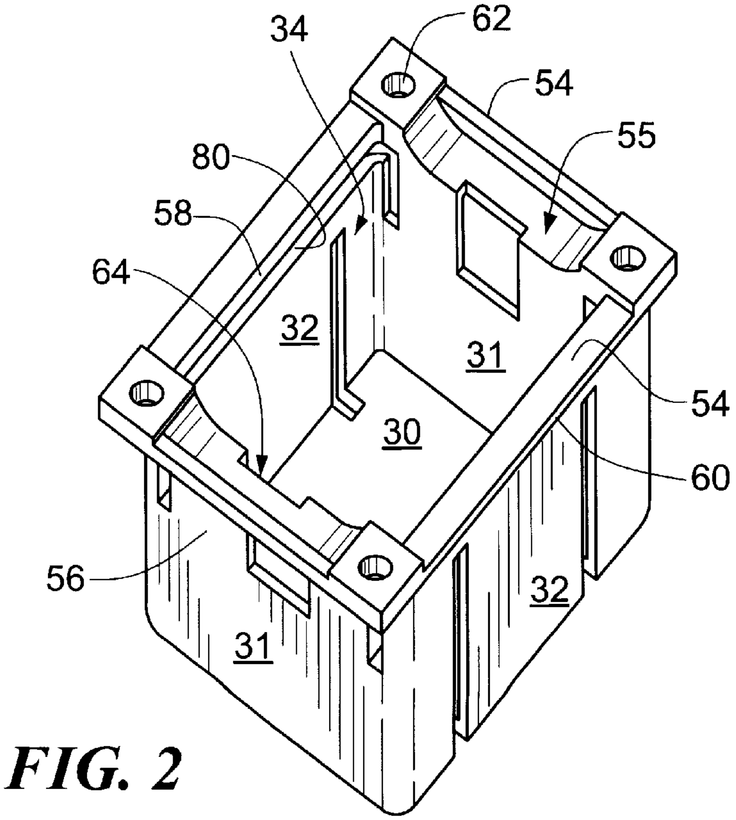
FIG. 2 is a top perspective view of the housing of FIG. 1.
Figure 3:
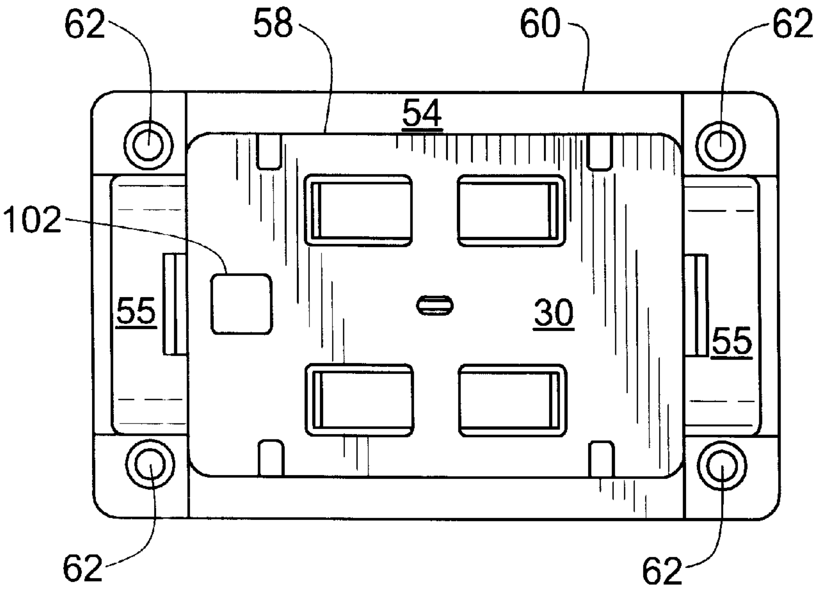
FIG. 3 is a top plan view of the housing of FIG. 1.
Figure 4:
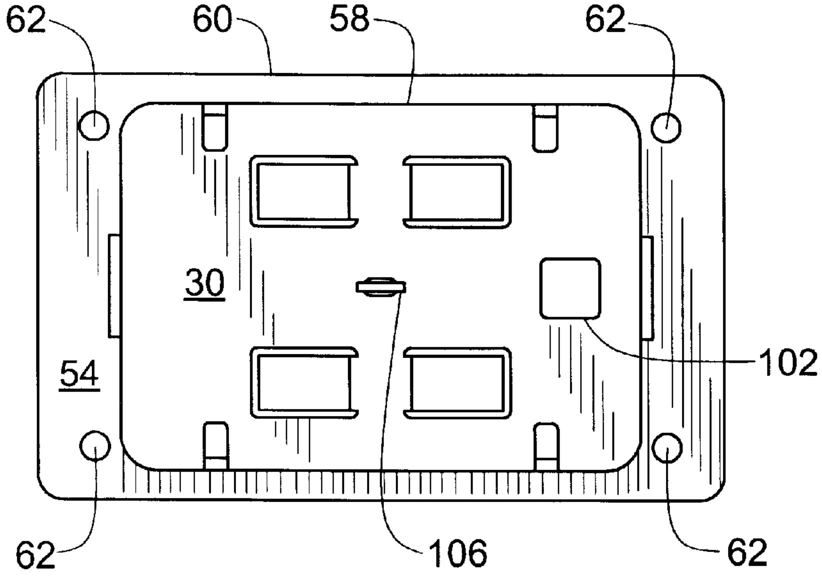
FIG. 4 is a bottom plan view of the housing of FIG. 1.

In a preferred embodiment, the control panel 38 is inserted into the open face 34 of the housing 10. As the control panel 38 descends through the open face 34, the resilient clips 52 are deflected inward by the interior surface 58 of the outer flange 54 until notches 53 that are formed on outer surfaces of the clips 52 engage the interior surface 58 of the flange 54. Releasable attachment of the control panel 38 to the housing 10 completes the enclosure around the electronics housed therein. The control panel 38 is removed by applying an inward pressure on the clips 52 to disengage the notches 53 in the clips 52 from the interior surface 58 of the flange 54. With reference to FIG. 2, the upper surface of the flange may be provided with notches 64 to facilitate the engagement of the clips 52 with the outer flange 54. The upper surface of the outer flange above each of the end walls 31 may also be provided with a shallow, recessed region 55 which reduces the size of the resilient clip notches 53 required to engage the interior surface 58 of the flange 54.

In a preferred embodiment, a battery holder 92, as illustrated in FIGS. 13–17, facilitates the removable installation of a battery cell, such as a standard 9 volt battery. The holder 92 is provided with holes 94 that enable the assembly of the holder 92 to the open face cover 36 by using screws or other fasteners. The holder 92, as illustrated, has four prongs 90 each extending outwardly from a respective leg 96 beneath the holder 92 for insertion into guide channels 82 located in the side walls 32 of the housing 10.

Figure 6:
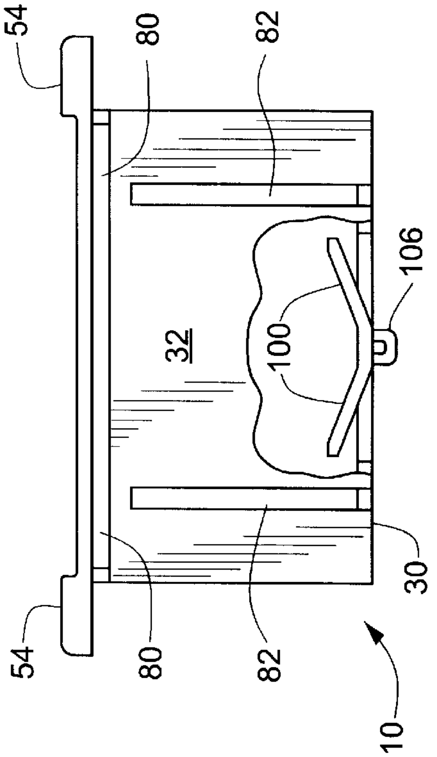
FIG. 6 is a side elevation view of the housing of FIG. 1, partially cut away to show interior detail.

Guide channels 82, as illustrated in FIG. 6, are cut or molded into the side walls 32 of the housing 10. In this embodiment, the side walls 32 that contain the guide channels 82 do not also contain the channels 70 that define flange supports 56. The guide channels 82 extend from the floor 30 of the housing 10 upward toward the outer flange 54. The guide channels 82 receive the prongs 90 of the battery holder 92 and direct the movement of the battery holder 92 as it is inserted into or removed from the housing 10 due to interference between each prong 92 and the upper extent of the respective guide channel 82.

As the battery holder 92 is elevated from within the housing 10, knees 98 disposed adjacent a respective prong 90 on each leg 96 follow the interior surface of the housing 10 proximate the upper extent of the side walls 32. This forces the legs 96 to flex inwardly. As the knees 98 pass above the side walls 32 and into the open space 80, the legs return to the original position, thus extending the knees over the side walls 32. The interior of the battery holder 92 is then easily accessible, facilitating the removal and installation of a battery cell. For complete removal of the battery holder 92 and attached open face cover 36 from the housing 10, the resilient prongs 90 are deflected inwardly out of engagement with the guide channels 82.

According to a further embodiment of this disclosure, the floor 30 of housing 10 has upwardly protruding angular structures 100 that exert upward pressure on the battery holder 92 housed therein to facilitate its easy removal from the housing 10. The floor 30 may also be provided with an aperture 102 for electrical conductors (not shown) in communication with the electronic circuitry disposed within the open face cover 36. The conductors may be bundled together as a cable, or may be provided as individual shielded conductors. This aperture allows the conductors to move with the open face cover 36 as it is extended out of the housing 10 while controlling the path the moving conductors follow. A loop 106 may be provided to attach the conductors to the housing 10, such as with a tie-wrap, thus further defining the path of travel for the conductors or cable(s).

Figure 18:
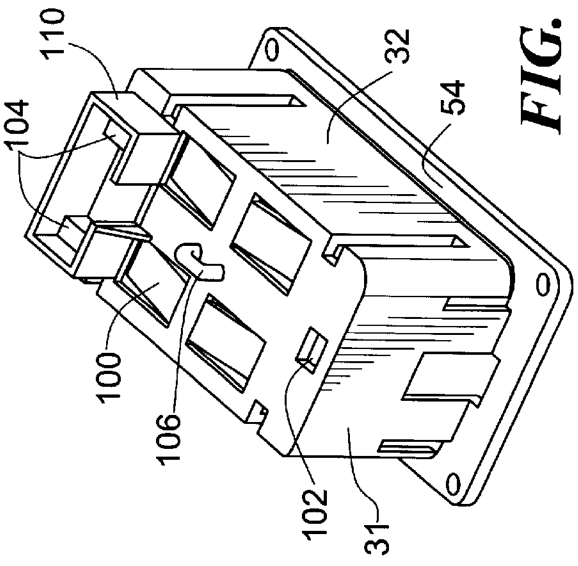
FIG. 18 is a bottom perspective view of an alternative embodiment of the housing of FIG. 1.
Figure 17:
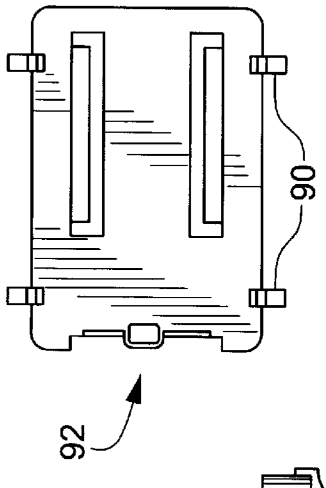
FIG. 17 is a bottom plan view of the holder of FIG. 13.
Figure 16:
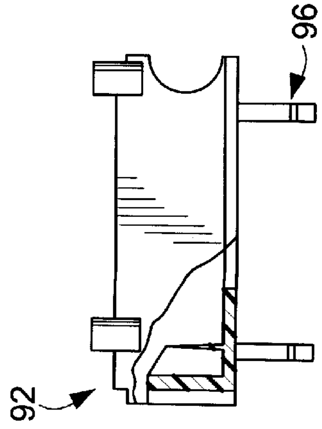
FIG. 16 is a partial cross sectional view of a side of the holder of FIG. 13.

The opposite end of the conductors may be connected directly to another circuit external to the housing 10, such as a string transducer for a guitar, or to a terminal block or blocks 104 such as that shown on the bottom of the housing in the alternative embodiment of FIG. 18. Such terminal blocks 104 may be disposed within a protective enclosure 110, as shown in FIG. 18. The terminal blocks 104 may in turn be in electrical communication with the external circuit referenced above.

While the housing having a flexibly mounted outer flange according to the present disclosure has been illustrated and described in the context of an electronics enclosure for an acoustic guitar, other applications are envisioned. For instance, this housing can be used as a junction box for electrical wiring to be mounted on a pole, a curved wall (convex or concave), or other non-planar or planar surfaces. Still other applications for this advancement may be found. Thus, these and other examples of the invention illustrated above are intended by way example and the actual scope of the invention is to be limited solely by the scope of the following claims.

What is claimed is:

1. A housing capable of being mounted on a planar or contoured surface, comprising:

an enclosure;

a flexible mounting flange adapted to flexibly and conformably connect said enclosure to said surface; and at least two flange support elements formed as part of said enclosure to engage said mounting flange, said flange support elements forming a space between said mounting flange and said enclosure and being configured to enable said mounting flange to flex relative to said enclosure.

2. The housing of claim 1, wherein said flexible mounting flange and said flange support elements are configured to allow portions of said flexible mounting flange to travel within said space.

3. The housing of claim 1, wherein said flange support elements are partially defined by channels formed in said enclosure.

4. The housing of claim 1, wherein said housing is constructed from NYLON 6.

5. The housing of claim 1, wherein said enclosure is comprised of a floor, a pair of opposing end walls each having first and second ends, and a pair of opposing side walls each having first and second ends, said floor is connected to said first end of each of said end walls and said side walls, and said second end of each of said end walls and said side walls define an open face opposite said floor.

6. The housing of claim 5, wherein said flange support elements are partially defined by channels formed in said enclosure and wherein said channels are formed in said enclosure proximate said open face of said enclosure.

7. The housing of claim 5, further comprising an open face cover adapted for releasable attachment within said open face of said enclosure, wherein releasable attachment of said open face cover does not interfere with the ability of said mounting flange to flex relative to said enclosure.

8. The housing of claim 7, wherein said open face cover further comprises resilient members for engaging said mounting flange.

9. The housing of claim 7, further comprising an electronic circuit disposable within said open face cover.

10. The housing of claim 9, wherein said electronic circuit comprises electronic signal conditioning circuitry.

11. The housing of claim 9, wherein said open face cover further comprises a battery holder adapted for receiving a battery.

12. The housing of claim 11, wherein said enclosure further comprises guide channels that extend proximate said open face of said enclosure, and wherein said battery holder further comprises projections which extend into said guide channels for guiding said battery holder and said open face cover into and out of said enclosure.

13. The housing of claim 11, wherein said floor of said enclosure further comprises upwardly protruding angular elements for exerting upward pressure on said battery holder when said battery holder is disposed therein.

14. A method of disposing a housing into an aperture formed in a contoured surface, comprising the steps of:

providing a housing comprising an enclosure and a flexibly attached mounting flange whereby a space is formed between a part of said enclosure and said flexibly attached mounting flange;

inserting the enclosure into the aperture;

engaging the flexibly attached mounting flange of the housing with a surface adjacent the aperture; and releasably attaching the flexibly attached mounting flange to the surface adjacent the aperture.

15. A housing means capable of being mounted on a planar or contoured surface, comprising:

an enclosing means;

a flexible mounting flange; and flange support means disposed in said enclosing means, wherein said flange support means and said flexible mounting flange form a space between said flexible mounting flange and said enclosing means, said flexible mounting flange enabling the flexible and conformable engagement of said flexible mounting flange to said planar or contoured surface.

* * * * *